Nov. 12 1968   C. D. PEIFER   3,410,234
SOIL CONDITIONER APPLICATOR
Original Filed July 14, 1966   2 Sheets-Sheet 1
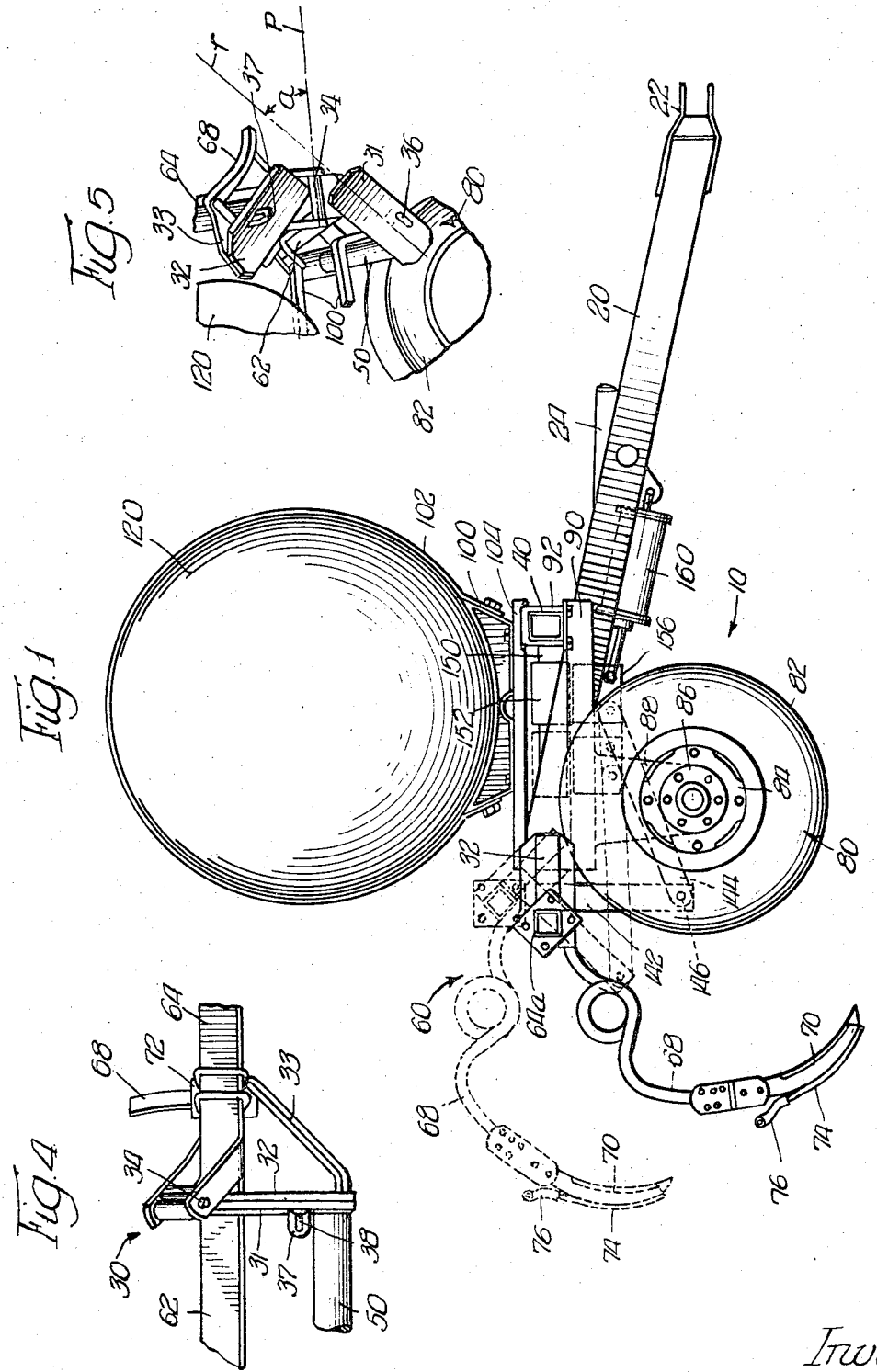
Inventor:
Charles D. Peifer,
By Hume, Groen, Clements & Hume
Attys

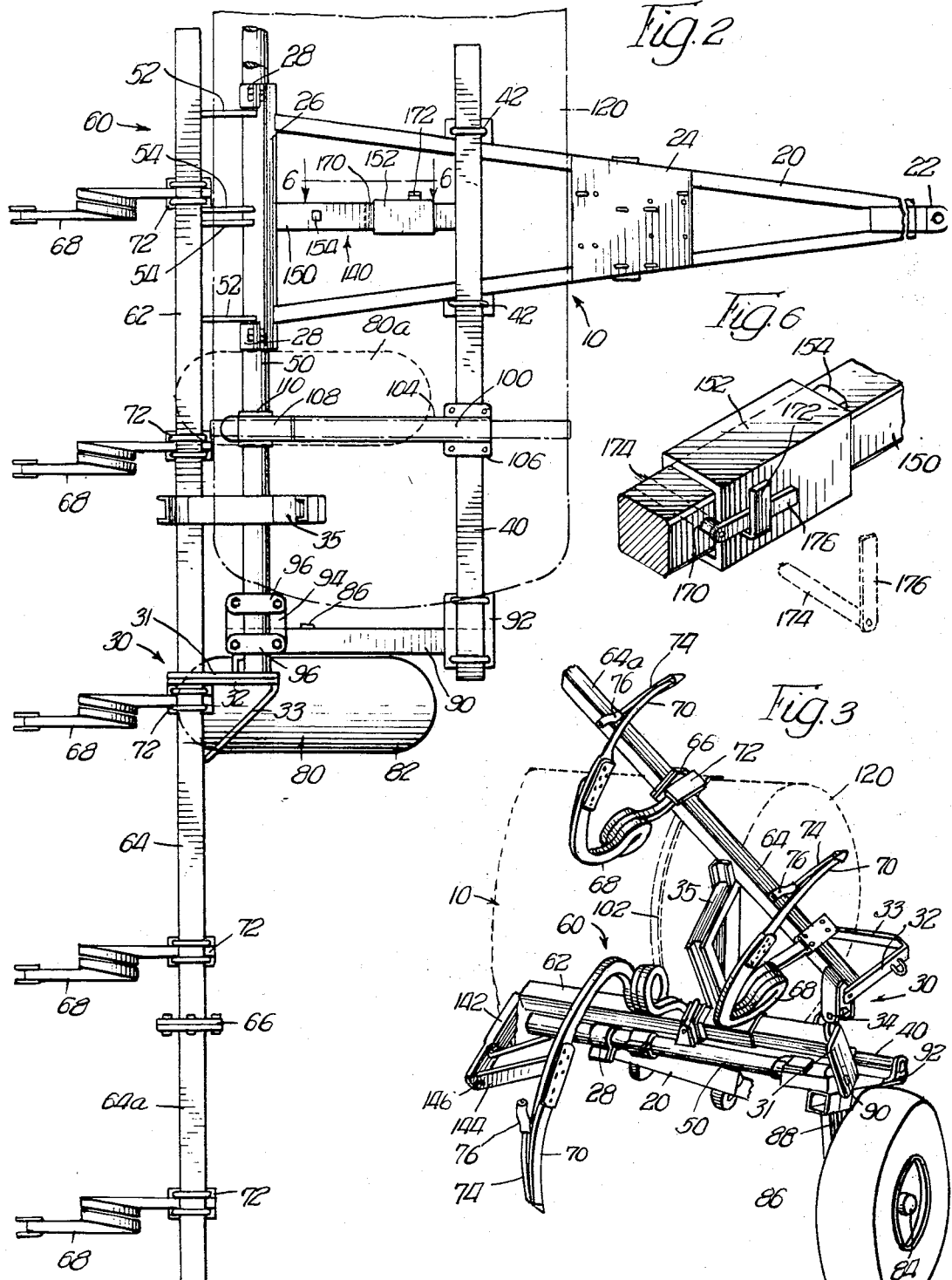

United States Patent Office 3,410,234
Patented Nov. 12, 1968

3,410,234
SOIL CONDITIONER APPLICATOR
Charles D. Peifer, Shelbyville, Ill., assignor to P & H Sales, Shelbyville, Ill., a partnership
Continuation of application Ser. No. 565,283, July 14, 1966. This application Dec. 4, 1967, Ser. No. 687,916
19 Claims. (Cl. 111—7)

ABSTRACT OF THE DISCLOSURE

This invention comprises an applicator assembly for introducing conditioners such as fertilizers into soil. The assembly principally includes a draw bar with a rearward transverse bearing in which a transversely extending tool bar assembly is supported. An elongate frame member is also mounted on the draw bar spaced from the bearing, and extending a substantially equal transverse distance from each side of the draw bar. The tool bar assembly is capable of orbiting vertically within said bearing means, and includes penetrators for breaking the soil and introducing a soil conditioner therein. In the preferred embodiment the tool bar assembly has foldable end sections, and the soil penetrators are releasably secured to the tool bar to permit the transverse spacing of said penetrators to be selectively varied. Linkage means and releasable locking means control the vertical positioning of the tool bar assembly. The tool bar assembly further includes a roll bar mounted in said bearing means which preferably has substantially the same transverse extent as the frame member. The assembly also includes means for supporting a soil conditioner storage tank and supporting wheel assemblies. The wheel assemblies are releasably secured to said frame member, and also preferably to said roll bar of said tool assembly in a manner which permits the wheel assemblies to be adjusted transversely with respect to each other and with respect to said tool bar assembly.

General description of the invention

This case is a continuation of Ser. No. 565,283, filed July 14, 1966, now abandoned.

This invention relates generally to farm implements, and more particularly relates to an applicator unit for introducing conditioners such as fertilizers into the soil.

At the present time there are many types of applicator units available which break the ground with knife tines or discs and then introduce a suitable liquid or solid conditioner, such as anhydrous ammonia and the like, into the soil. Generally, such prior applicator units are of relatively complicated construction, and include rigid and unflexible frame structures which prevent them from operating at optimum efficiency in the field. The structural framework of the prior applicators add unnecessary weight to the unit, thereby requiring a substantial draft force to pull the unit during soil-conditioning operations. The heavy and rigid frame structure also prevents prior units from being readily adapted to meet varying field conditions, such as crop row width, and prevents the units from being readily adjusted to operate at different swath widths. Moreover, the construction of prior applicator units makes it difficult to adjust the units for stable, safe travel along relatively narrow passageways, such as along frontage roads and highways.

Accordingly, it is the principal object of this invention to provide a soil conditioner applicator unit having a substantially frameless, lightweight construction.

It is another object of this invention to provide a lightweight conditioner applicator unit which is very stable in operation and which can be readily adapted to apply conditioners to the soil at varying swath widths, and under varying field conditions.

It is still another object of this invention to provide a lightweight applicator unit which can be readily adapted for safe and stable travel along narrow passages, such as frontage roads and highways.

Description of an exemplary embodiment

Additional objects and features of this invention will become more apparent from the following description of an embodiment thereof, taken in conjunction with the accompanying drawings, in which:

FIGURE 1 is a side elevational view of an applicator unit embodying the features of the present invention;

FIGURE 2 is a partial plan view of the applicator unit shown in FIGURE 1;

FIGURE 3 is a rearward perspective view of the applicator unit shown in FIGURES 1 and 2, with the tool bar of the unit illustrated in a raised or folded position;

FIGURE 4 is an elevational view of a tool bar hinge construction employed on the applicator unit, shown in a closed or locked position;

FIGURE 5 is a perspective view of the tool bar hinge shown in an opened or unlocked position; and FIGURE 6 is a perspective view of a lock-up device utilized in the applicator unit to control the vertical positioning of the tool bar, as viewed from the direction indicated by the line 6—6 in FIGURE 2.

Referring to FIGURES 1 through 3 of the drawings, the applicator unit embodying the features of the present invention is generally indicated by the reference numeral 10. The applicator unit 10 generally includes a V-shaped draw bar 20, a transverse frame member 40, a rolling tool bar assembly 60, and supporting wheel assemblies 80. The applicator unit 10 also includes tank saddles 100 for supporting a suitable conditioner storage and distributing tank 120. As explained further below, these major components of the applicator unit 10 embodying the features of this invention are assembled in a manner which eliminates the need for a separate rigid and heavy frame structure. More particularly, these above-described major components are interconnected in a novel manner which permits the components to be selectively positioned so that the applicator unit 10 will operate safely and efficiently under varying field conditions and on roads and highways.

Referring to FIGURES 1 and 2 in more detail, the draw bar 20 is V-shaped in design and has a substantial longitudinal or horizontal length. The outer end of draw bar 20 is preferably angled downwardly toward the ground, as seen in FIGURE 1, and includes a suitable hitching mechanism 22 for connecting the applicator unit 10 to a power vehicle such as a tractor (not shown). The draw bar 20 is also provided with a universal base plate 24 to support the metering pumps and compressors (not shown) which are conventionally employed to distribute anhydrous ammonia or the like from the tank 120 during the soil conditioning operation. Since the applicator unit 10 is symmetrical about the longitudinal center line of the draw bar 20, only one side of the unit 10 is fully illustrated in FIGURES 2 and 3 of the drawings.

As seen from FIGURE 2, the rear end of the draw bar 20 is provided with a generally cylindrical sleeve member 26 which extends in a transverse direction with respect to the center line of the draw bar 20. The sleeve 26 is preferably hemispherical in shape, and includes a pair of arcuate clamps 28 at its ends. As explained further hereinafter, the sleeve 26 and the clamps 28 thereby define a transverse bearing surface for receiving a portion of the tool bar assembly 60 so that the tool bar assembly can be rotatably supported at the rear of the draw bar 20.

The applicator unit 10 also includes an elongate frame member 40 extending transversely across the draw bar 20 in a position substantially parallel to the sleeve 26. More particularly, the frame member 40 is spaced horizontally from the rear end of the draw bar 20 in substantially the same horizontal plane as the sleeve 26, and projects an equal distance from each side of the draw bar 20. Suitable clamps 42 secure the frame member 40 to the draw bar 20 in the above-described position. The connection of the draw bar 20 and frame member 40 by means of the clamps 42 allows the maximum width of the applicator unit 10 to be easily modified, if desired, by replacing the frame member 40 with another member having a selected transverse length.

The rolling tool bar assembly 60 included in the present invention is located adjacent the rear end of the draw bar 20, as shown in FIGURES 1 and 2. In order to have the substantial transverse width desired for soil conditioning operations, the tool bar assembly 60 is constructed from a central tool bar section 62 which has folding tool bar end sections 64 (only one of which is illustrated in FIGURES 2 and 3). As explained in detail hereinafter, a hinge assembly 30 joins the end tool bar sections 64 to the central section 62 in a manner which allows the end sections to be folded up, as shown in FIGURE 3, when the applicator unit 10 is traveling along a narrow passageway. When folded down into alignment with the central tool bar section 62, as shown in FIGURE 2, the end sections 64 permit the tool bar assembly 60 extend a substantial distance beyond the sides of the draw bar structure 20 and the transverse frame member 40. Further adjustment in the width of the tool bar assembly 60 is made possible by providing the tool bar end sections 64 with a flanged joint 66. The end sections 64 can then be shortened by disconnecting the joint 66 and removing an outer portion 64a of the end section; or can be lengthened by adding a longer tool bar section to the tool bar assembly 60 at the joint 66.

The tool bar assembly 60 further includes suitable soil-penetrating apparatus for breaking the ground below the applicator unit 10 and injecting a suitable conditioner into the broken soil. In this regard, the tool bar assembly 60 is provided with a plurality of coiled tines 68 having downwardly projecting knife blades 70. As seen in FIGURES 1 and 2, the tines 68 are transversely spaced along the tool bar sections 62 and 64, and are connected to the adjacent tool bar sections by suitable clamps 72. The clamps 72 therefore permit the relative transverse spacing of the tines 68 and the associated knife blades 70 to be adjusted to meet varying field conditions, such as differing crop row widths.

By the above arrangement, the knife blades 70 can be lowered into engagement with the ground at the desired spaced intervals to cut an open furrow in the soil upon forward movement of the applicator unit 10 through the field. To direct a liquid or solid soil conditioner from the storage tank 120 into the soil thereby broken open by the knife blades 70, each of the knife blades 70 includes an injecting nozzle 74 at its lower end, as shown in FIGURE 1. The nozzles 74 are connected by suitable conduits 76 (FIGURE 1) through suitable valves and metering pumps (not shown) to the soil conditioner tank 120. A metered flow of conditioner can then be conducted through the conduits 76 and the nozzles 74 into the soil, in the well-known manner.

In order to secure the tool bar assembly 60 to the applicator unit 10 in the manner contemplated by this invention, the tool bar assembly 60 includes a roll pipe 50 which can be rotatably mounted within the above-described sleeve 26 on the draw bar 20. As seen from FIGURE 2, the roll pipe 50 has substantially the same transverse length as the frame member 40 and the central tool bar section 62, and is connected to the central tool bar section 62 by end straps 52 adjacent the clamps 26 and straps 54 in the center of the roll pipe 50. The straps 52 and 54 thereby join the central tool bar section 62 and the roll pipe 50 together in a spaced but generally parallel relationship. Moreover, the straps 52 are arranged to be engageable with the clamps 28 to prevent any substantial axial movement of the roll pipe 50.

As a result of the above-described construction, the tool bar assembly 60 can be rotatably connected to the applicator unit 10 by placing the roll pipe 50 within the sleeve 26 and securing the clamps 28 around the roll pipe 50. After being mounted on the draw bar 20 in such a position, the rotation of the roll pipe 50 within the sleeve 26 will cause the entire tool bar assembly 60 to orbit or roll around the roll pipe 50. Accordingly, the soil-penetrating knife blades 70 can be moved in a vertical plane, and selectively engaged with the ground below the applicator unit 10, by rolling the tool bar sections 62 and 64 vertically downwardly around the roll pipe 50.

The applicator 10 is also provided with a lift mechanism 140 for adjustably controlling the vertical position of the tool bar assembly 60 with respect to the draw bar 20. As seen from FIGURE 1, the lift mechanism 140 includes a pair of links 142 and 144 which are pivotally joined together at one of their ends by a pivot pin 146. The lift mechanism 140 also includes a longitudinally disposed guide member 150 secured to the draw bar 20 between the frame member 40 and the sleeve 26. Further, a slide ring 152 is mounted around the guide member 150 and is free to slide longitudinally along the guide member between the frame member 40 and a rearward stop 154. As also shown in FIGURE 1, the slide ring 152 includes a depending flange 156 to which the other end of the link 144 is pivotally connected. The other end of the link 142 is fixed to the tool bar assembly 60 by being welded or otherwise secured between the center straps 54 (FIGURE 2).

In operation of the lift mechanism 140, the movement of the slide ring 152 toward the front end of the guide member 150 (to the right in FIGURES 1 and 2) will roll the tool bar assembly 60 about the roll pipe 50 and move the tine knife blades 70 downwardly into engagement with the ground, as shown in solid lines in FIGURE 1. On the other hand, the movement of the slide ring 152 toward the rear end of the guide member 150 (to the left in FIGURES 1 and 2) will transmit force through the links 142 and 144 and roll the tool bar assembly 60 into a raised position such as shown in phantom in FIGURE 1. The lift mechanism 140 thereby permits the tool assembly 60 to be readily adjusted into the desired vertical position. Although the lift mechanism 140 can be manually operated, it is preferred to provide the applicator unit 10 with a suitable device such as a hydraulic cylinder 160, connected between the slide ring 152 and the draw bar 20, so that the vertical positioning of the tool bar assembly 60 can be remotely controlled during the operation of the applicator unit 10.

To assure safe movement of the applicator unit 10 when the tool bar assembly 60 is in a raised position, the lift mechanism 140 is provided with a lock-up device which prevents the raised tool bar assembly 60 from accidentally falling. In this regard, the guide member 150 is provided with a transverse aperture 170 and the slide ring 152 is provided with a retaining brace 172 (FIGURES 2 and 6). When the slide ring 152 is moved to its extreme rearward position against the stop 154, as illustrated in FIGURE 6, the slide ring 152 exposes the aperture 170. In fact, the aperture 170 is selectively spaced from the stop 154 so that one end of the slide ring 152 is positioned closely adjacent to the aperture 170 when the other end of the slide ring is engaged with the stop 154. A locking pin 174 having a perpendicular handle 176 is then inserted within the aperture 170 and rotated so that the handle 176 is engaged within the retaining brace 172.

As seen in FIGURE 6, the brace 172 engages the handle 176 and prevents the pin 174 from being accidentally removed from the aperture 170 by the movement of the applicator unit 10. Moreover, the pin 174 engages with the slide ring 152 and prevents the slide ring 152 from moving forwardly along the guide member 150, thereby securely locking the tool bar assembly 60 in a raised position. The tool bar assembly 60 can be released and lowered by rotating the locking pin 174 until the handle 176 clears the brace 172 (as shown in phantom in FIGURE 6) and then removing the locking pin 174 from the aperture 170. The above-described lock-up device thus allows the applicator unit 10 to be safely moved with the tool bar assembly 60 locked in a raised position.

The hinge assemblies 30, about which the tool assembly 60 will laterally fold upon itself, also permits the applicator unit 10 to move safely along narrow passageways such as frontage roads and highways. As seen in FIGURES 2, 4 and 5, each hinge 30 comprises a pair of mating hinge plates 31 and 32 connected between the central tool bar section 62 and the tool bar end sections 64. More particularly, the hinge plate 31 is constructed from a rigid flat plate, and is welded across the transverse ends of the roll pipe 50 and the central tool bar section 62. The hinge plate 32, also of flat and rigid construction, is welded at its top portion to the tool bar end section 64, and is strengthened at its bottom portion by a strut 33 connected to the tool bar end section 64. As illustrated in FIGURE 4, the hinge plates 31 and 32 have a substantial length so that the hinge assembly 30 will rigidly support the tool bar end sections 64 in the unfolded position without the need for extra stabilizers such as gauge wheels and the like.

The hinge pin 34 joins the plates 31 and 32 together so that the plates may pivot relative to one another from a closed position as shown in FIGURE 4 to an open position as shown in FIGURE 5. More particularly, the hinge pin 34 in accordance with this invention has its axis $p$ inclined at an acute angle $a$ from the radius of rotation $r$ of the tool assembly 60, as illustrated in FIGURE 5. The angle $a$, which is preferably approximately 45 degrees, allows the end sections 64 of the tool bar assembly 60 to be folded upwardly at an angle inclined from the plane of the tool bar assembly 60 defined by the roll pipe 50 and the central tool bar section 62.

As a result of the above-described arrangement of each tool bar hinge 30, the tool bar end sections 64 can be easily folded when the tool bar assembly 60 is in a lower position adjacent to the ground, since the angle of the hinge pin 34 makes it unnecessary to raise the entire weight of the end sections 64 directly upward. As illustrated in FIGURE 3, the inclined hinge pin 34 also results in a substantially vertical positioning of the folded tool bar end sections 64 when the tool bar assembly 60 is rolled into its extreme upward position, thereby minimizing the rearward overhang of the folded tool bar assembly. Moreover the above-described tool bar hinge 30 minimizes the likelihood of interference between the tines 68 and knife blades 70 on the central tool bar section 62 and tool bar end sections 64 when the tool bar assembly 60 is folded.

Means are also provided on the tool bar assembly 60 to secure the tool bar end sections 64 in the above-described folded position. In this regard, a suitable support bracket 35 is removably clamped to the central tool bar section 62, and will secure the tool bar end sections 64 in their upwardly folded position. As seen in FIGURES 2 and 3, the bracket 35 can be moved transversely along the central tool bar section 62, if necessary, so as not to interfere with the tines 68 or knife blades 70 of the folded tool bar assembly.

To lock the tool bar assembly 60 in its unfolded position, the hinge plate 31 is provided with an aperture 36 which will receive a staple 37 projecting from the mating hinge plate 32, as seen from FIGURES 4 and 5. When the hinge 30 is closed, a suitable locking device such as a wedge 38 can be driven through the staple 37 to maintain the hingle plates 31 and 32 in a mated relationship.

Referring to FIGURES 1, 2 and 3, the tank saddles 100 are connected to the conditioner tank 120 by any suitable means such as the connecting straps 102, and are supported on the applicator unit 10 by means of longitudinal cross-members 104 (only one of which is shown). The forward end of each cross-member 104 is secured to the transverse frame member 40 by a clamp 106, and the rear of each cross-member is provided with a bearing block 108. The bearing blocks 108 include a hollow bearing 110 which rotatably receives the roll pipe 50 of the tool bar assembly 60.

Accordingly, the clamp 106 releasably secures the cross-member 104 and its associated tank saddle 100 in the desired transverse position on the draw bar 20, and the bearing block 108 permits the roll pipe 50 to rotate freely with respect to the draw bar 20. The tank saddles 100 can therefore be arranged on the applicator unit 10 to support conditioner tanks such as tank 120 of various diameters and lengths without interfering with the operation of the rolling tool bar assembly 60.

Finally, the applicator unit 10 in accordance with this invention is supported for movement over the ground by a set of adjustable wheel assemblies 80. As seen in FIGURES 1, 2 and 3, one wheel assembly 80 is positioned on each side of the draw bar structure 20, and includes a conventional tire 82 mounted on a hub 84. The hub 84 is rotatably mounted on a stud shaft 86 and the shaft 86 is in turn connected to the lower end of a downwardly extending support arm 88. A crossbar 90 is connected to the top portion of support arm 88 for joining the wheel assembly 80 to the applicator unit 10.

More particularly, each of the wheel assemblies 80 includes a clamp member 92 which releasably secures the front end of the crossbar 90 to the transverse frame member 40. In addition, a bearing block 94 having aligned hollow bearings 96 is connected to the rear end of the crossbar 90 with the bearings 96 extended over the roll pipe 50. By this arrangement, the wheel assemblies 80 embodied in this invention can be releasably secured by the clamps 92 in the desired transverse position along the frame member 40 and the roll pipe 50. Moreover, the bearing block 94 will support the rear end of the wheel assemblies 80 in a manner which permits the lateral positionings of the wheel assemblies 80 to be adjusted without interfering with the operation of the rolling tool bar assembly 60. This arrangement of the applicator unit 10 also allows additional supporting wheel assemblies, such as the wheel assembly 80a shown in phantom in FIGURE 2, to be readily connected to the frame member 40 and roll pipe 50 in a similar manner.

From the above description it is apparent that the frame structure for operatively supporting the tool bar assembly 60, the storage tank 120 and the other components on the applicator unit 10 is formed from the draw bar 20, the single frame member 40 and the rotatable roll pipe 50. The applicator unit 10 embodying the features of the present invention thus eliminates the need for any rigid and heavy frame structure which would inhibit the operation of the unit. Instead, the applicator unit 10 is lightweight and substantially frameless, and can be easily pulled through the field during the soil conditioning operations. In addition, the connection of the tool bar assembly 60 to the draw bar 20 through the two spaced clamps 28 (FIGURE 2) and the links 142 and 144 (FIGURE 1) provides a three-point connection for transmitting the draft force to the tool bar assembly which stabilizes the movement of the applicator unit 10 through the field.

It is further apparent from the above description that the components of the applicator unit 10 can be readily adjusted with respect to each other to adapt the applicator unit for safe and efficient travel over fields and along roadways under various conditions. In particular, the construction of the applicator unit 10 permits the wheel assemblies 80 to be transversely adjusted with respect to each other and with respect to the rolling tool bar assembly 80, and the ground-engaging knife blades 70 can be readily adjusted in both vertical and transverse directions. Accordingly, the components of the applicator unit 10 can be arranged so that the unit is stable and efficient when applying conditioner at various swath widths and crop row spacings.

Although the above-described embodiment is preferred, it will be appreciated by those skilled in the art that various modifications of the functions and features of the applicator unit can be made without departing from the scope of this invention, as defined by the appended claims.

What is claimed is:

1. A soil conditioner applicator comprising, in combination, an elongate draw bar having a substantial longitudinal extent and including hitching means adjacent the front end thereof for joining the applicator to a draft vehicle, said draw bar further including transverse bearing means adjacent the rear end thereof, a frame member joined to said draw bar in a position longitudinally spaced from said bearing means and extending a substantially equal transverse distance from each side of said elongate draw bar, a transversely extending tool bar assembly positioned adjacent said rear end of said draw bar and rotatably joined to said draw bar by said bearing means, said tool bar assembly including transversely spaced and vertically extending soil penetrators, means for selectively rotating said tool bar assembly within said bearing means and rolling said tool bar assembly vertically with respect to said draw bar to thereby control the engagement of said penetrators with the soil, means to releasably lock said tool bar assembly in a vertically raised position with said penetrators disengaged from the soil, means to connect said penetrators to a source of soil conditioner, a supporting wheel assembly positioned on each side of said draw bar adjacent said transverse frame member for transporting said applicator in a longitudinal direction, and connecting means releasably joining each of said wheel assemblies to said frame member, said connecting means being securable to said frame member in a plurality of predetermined transverse positions to permit adjustment of said wheel assemblies transversely with respect to each other and with respect to said tool bar assembly.

2. A soil conditioner applicator in accordance with claim 1 wherein said soil penetrators are releasably secured to said tool bar assembly by clamping means which permit the transverse spacing of said penetrators to be selectively varied on said tool bar assembly.

3. A soil conditioner applicator in accordance with claim 2 wherein said soil penetrators of said tool bar assembly are releasably secured to an elongate tool bar having a central section adjacent said draw bar and a foldable end section projecting transversely from each of said sides of said draw bar.

4. A soil conditioner applicator comprising, in combination, an elongate draw bar having a substantial longitudinal extent and including hitching means adjacent the front end thereof for joining the applicator to a draft vehicle, said draw bar further including transverse bearing means adjacent the rear end thereof, a frame member joined to said draw bar intermediate said ends and spaced longitudinally from said bearing means with said frame member extending a substantially equal transverse distance from each side of said draw bar, a tool bar assembly positioned adjacent said rear end of said draw bar, said tool bar assembly including an elongate roll bar rotatably supported on said draw bar within said bearing means, said tool bar assembly further including an elongate tool bar connected in a substantially parallel spaced relationship to said roll bar and having a plurality of transversely spaced soil penetrators thereon, control means to selectively rotate said roll bar within said bearing means and orbit said tool bar about said roll bar and thereby control the engagement of said penetrators with the soil, means to connect said penetrators to a source of soil conditioner, a supporting wheel assembly positioned on each side of said draw bar adjacent said frame member for transporting said applicator in a longitudinal direction, and connecting means releasably joining each of said wheel assemblies to said frame member, said connecting means being securable to said frame member in a plurality of predetermined transverse positions and permitting adjustment of said wheel assemblies transversely with respect to each other and with respect to said tool bar assembly.

5. A soil conditioner applicator in accordance with claim 4 wherein said connecting means joining each of said wheel assemblies to said frame member comprises a cross-member connected to said wheel assembly and extended between said frame member and said roll bar, said cross-member having a front end releasably clamped to said frame member and further having a rear end rotatably connected to said roll bar.

6. A soil conditioner applicator in accordance with claim 5 wherein said roll bar of said tool bar assembly supported within said bearing means has substantially the same transverse extent as said frame member to permit said cross member of said wheel assembly to be extended between said frame member and said roll bar at selective positions along the transverse length of said frame member.

7. A soil conditioner applicator in accordance with claim 4 wherein said source of soil conditioner comprises a conditioner storage and dispensing tank mounted on said applicator by means of a saddle member extended between said frame member and said roll bar, and wherein said saddle member includes a front end releasably clamped to said frame member and a rear end rotatably connected to said roll bar.

8. A soil conditioner in accordance with claim 4 wherein said soil penetrators are releasably secured to said tool bar by clamping means which permit the transverse spacing of said penetrators to be selectively varied on said tool bar.

9. A soil conditioner applicator in accordance with claim 4 wherein said tool bar comprises a central tool bar section connected to said roll bar and a pair of end tool bar sections transversely aligned with said central section and wherein said end sections are joined to said central section by hinge means permitting said end sections to fold transversely upward toward said central section.

10. The invention according to claim 9 wherein said hinge means are operative to fold said end tool bar sections upwardly toward said central tool bar section at an angle inclined to the plane of said central tool bar section and said roll bar.

11. The invention according to claim 4 wherein said control means comprises a longitudinal guide member connected to said draw bar and having a ring member slidably mounted thereon, and wherein said control means further comprises linkage means operably connecting said ring member to said tool bar to orbit said tool bar about said roll bar in response to longitudinal movement of said ring member along said guide member.

12. The invention according to claim 11 wherein said linkage means orbits said tool bar upwardly with respect to said draw bar in response to longitudinally rearward movement of said ring member along said guide member.

13. The invention according to claim 12 wherein said guide member includes a stop engageable with said ring member to limit the longitudinally rearward movement of said ring member and thereby define the extreme upward position of said tool bar, and wherein said guide member includes means to releasably retain said ring member in engagement with said stop.

14. The invention according to claim 13 wherein said guide member includes an aperture spaced forwardly from said stop and wherein said applicator includes a locking pin insertable within said aperture and engageable with said ring member to releasably retain said ring member in engagement with said stop.

15. Apparatus for applying a conditioner to soil comprising, in combination, an elongate draw bar having a substantial longitudinal extent and including hitching means adjacent the front end thereof for joining the applicator to a draft vehicle, said draw bar further including transverse supporting means adjacent the rear end thereof, a first frame member joined to said draw bar in a position longitudinally spaced from said supporting means and extending a substantially equal transverse distance from each side of said elongate draw bar, a second transverse frame member positioned adjacent said rear end of said draw bar and joined to said draw bar by said supporting means, a supporting wheel assembly positioned on each side of said draw bar adjacent said frame members for transporting said applicator in a longitudinal direction, connecting means operable to releasably join each of said wheel assemblies to at least one of said frame members in a plurality of predetermined transverse positions to permit adjustment of said wheel assemblies, transversely with respect to each other and with respect to said draw bar, and soil conditioner applying means joined to said second frame member and operable to apply a conditioner to the soil at a plurality of transversely spaced points below said apparatus.

16. An apparatus in accordance with claim 15 wherein said first and second frame members have substantially the same transverse extent and wherein said connecting means for said wheel assemblies comprises a cross-member connected to said wheel assembly and extended between said first and second frame members, said cross member having a front end releasably joined to said first frame member and further having a rear end releasably joined to said second frame member, whereby said wheel assemblies are adapted to be joined to said apparatus at selective positions along the transverse length of said frame members.

17. An apparatus in accordance with claim 15 wherein said soil conditioner applying means comprises a transverse bar having a plurality of transversely spaced means for applying conditioner to the soil and wherein said bar includes a central section joined to said second frame member and end sections extending transversely beyond said second frame member and adapted to fold upwardly toward said central section.

18. An agricultural implement comprising, in combination, an elongate draw bar having a substantial longitudinal extent and including hitching means adjacent the front end thereof for joining the implement to a draft vehicle, said draw bar further including transverse supporting means adjacent the rear end thereof, a first frame member joined to said draw bar in a position longitudinally spaced from said supporting means and extending a substantially equal transverse distance from each side of said draw bar, a second transverse frame member positioned adjacent said rear end of said draw bar and joined to said draw bar by said supporting means, said first and second frame members having substantially the same transverse extent, a supporting wheel assembly positioned on each side of said draw bar for transporting said implement in a longitudinal direction, each of said wheel assemblies including a cross-member extended between and releasably joined to said first and second frame members, and tank mounting means extended between and releasably joined to said first and second frame members and adapted to support a storage tank on said implement, said wheel assemblies and said tank mounting means are adapted to be joined to said frame members at selective positions along the transverse length of said frame members to provide said implement with a plurality of transverse wheel spacings and to permit said implement to support tanks of varying transverse length.

19. An agricultural implement in accordance with claim 18 wherein said tank mounting means comprises a plurality of saddle members, with each of said saddle members having a front end releasably joined to said first frame member and a rear end releasably joined to said second frame member, whereby each of said saddle members can be shifted transversely on said frame members to support tanks of various length on said implement.

References Cited

UNITED STATES PATENTS

| | | | |
|---|---|---|---|
| 2,731,901 | 1/1956 | Tye | 111—7 |
| 3,157,139 | 11/1964 | Spindler | 111—7 |
| 3,190,367 | 6/1965 | Kopaska | 172—456 |
| 3,262,505 | 7/1966 | Brakhage | 172—456 |

ROBERT E. BAGWILL, *Primary Examiner.*